(12) United States Patent
Kobayashi et al.

(10) Patent No.: US 6,704,035 B2
(45) Date of Patent: Mar. 9, 2004

(54) IMAGE FORMING APPARATUS HAVING SIMPLE DRIVE TIMING CONTROL

(75) Inventors: Shinji Kobayashi, Adachi-ku (JP); Tadashi Shinohara, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/373,755

(22) Filed: Feb. 27, 2003

(65) Prior Publication Data
US 2003/0156179 A1 Aug. 21, 2003

Related U.S. Application Data

(62) Division of application No. 09/930,439, filed on Aug. 16, 2001, now Pat. No. 6,573,918.

(30) Foreign Application Priority Data

| Aug. 22, 2000 | (JP) | 2000-251279 |
| Sep. 11, 2000 | (JP) | 2000-275283 |
| Oct. 26, 2000 | (JP) | 2000-326746 |

(51) Int. Cl.$^7$ .............................................. G03G 15/01
(52) U.S. Cl. ...................................... 347/116; 347/234
(58) Field of Search ................................. 347/116, 118, 347/232, 234, 235, 248, 249

(56) References Cited

U.S. PATENT DOCUMENTS

| 4,933,549 A | 6/1990 | Fujioka et al. |
| 5,157,417 A | 10/1992 | Anzai |
| 5,436,647 A | 7/1995 | Kasahara |
| 5,517,318 A | 5/1996 | Suzuki |
| 5,646,749 A | 7/1997 | Omi et al. |
| 5,708,512 A | 1/1998 | Ishizuka |
| 5,970,224 A | 10/1999 | Salgado et al. |
| 6,055,084 A | 4/2000 | Shiraishi et al. |
| 6,301,021 B1 * | 10/2001 | Ohnuma ..................... 358/475 |
| 6,512,534 B2 * | 1/2003 | Koga .......................... 347/249 |

FOREIGN PATENT DOCUMENTS

| EP | 0 570 892 | 11/1993 |
| EP | 0 898 415 | 2/1999 |
| EP | 0 998 119 | 3/2000 |
| EP | 0 998 128 | 3/2000 |
| JP | 8-149241 | 6/1996 |
| JP | 2001-212999 A * | 8/2001 |

* cited by examiner

Primary Examiner—Joan Pendegrass
(74) Attorney, Agent, or Firm—Oblon, Spivak, McClelland, Maier & Neustadt, P.C.

(57) ABSTRACT

A color image forming apparatus for forming a color image on a storage medium using a laser beam generated from a laser generating means includes a plurality of image data interfaces provided between the color image forming apparatus and a peripheral device, image data interface conversion means for converting each of the image data interfaces into an image data interface for the laser generating means, and a single control means for controlling a drive timing of the laser generating means, the control means controlling the drive timing of the laser generating means for each one of a plurality of colors based on image data input from the image interface conversion means.

24 Claims, 13 Drawing Sheets

IMAGE FORMING APPARATUS HAVING SIMPLE DRIVE TIMING CONTROL

CROSS-REFERENCE TO RELATED APPLICATIONS

This application is a divisional application of, and claims priority to, Ser. No. 09/930,439, filed Aug. 16, 2001, now U.S. Pat. No. 6,573,918 B2, and claims priority to Japanese Application No. JP 2000-251279 filed Aug. 22, 2000; Japanese Application No. JP 2000-275283 filed Sep. 11, 2000; and Japanese Application No. JP 2000-326746 filed Oct. 26, 2000. The entire contents of the parent application is incorporated herein by reference.

BACKGROUND OF THE INVENTION

1. Field of the Invention

The present invention relates to an image forming apparatus for electrophotography/electrostatic recording color cameras, color printers, color facsimiles and the like, and more particularly, to a color image forming apparatus that uses a laser for writing.

2. Description of the Related Art

As one example of the above-described technology the invention disclosed in Japanese Laid-Open Patent Application No. 8-149241 is known. In this invention, which is aimed at making it easy to expand a system, an image forming apparatus and its peripheral equipment are connected to each other by a system controller universal bus.

That is, in the invention of Japanese Laid-Open Patent Application No. 8-149241, a system control unit equipped with a CPU is connected to a printer unit and a plurality of scanner units as well as an image memory unit by a universal bus, image data from the image processing terminal equipment from the printer unit and the scanner unit is stored in the image memory unit via the universal bus, and image formation carried out by processing image data from the image processing terminal equipment in response to a data request, so system expansion can be carried out easily by connecting image processing terminal equipment to the universal bus.

According to such conventional art, expanding a system composed of a printer controller plus a scanner plus an image forming apparatus requires only a printer controller universal bus as a data transmission path, making system expansion easy.

However, when for example data read from the scanner unit undergoes image processing and the image-processed data is then printed out, the data is once stored in the system bus image memory, returned to the image processor inside the scanner unit and then transferred to the image forming apparatus via the system bus. In such a case, the amount of traffic on the bus increases, reducing transfer efficiency and resulting in reduced printer performance.

Such a problem can be solved by for example by using the system bus as the interface between the printer controller and the image forming apparatus and between the printer controller and the scanner unit, and using a different interface between the scanner unit and the image forming apparatus. With this type of interface configuration, the image forming apparatus must be compatible with both interfaces and the lighting timing control of a laser diode (LD) of each color must also be made compatible with both interfaces.

Additionally, as an image forming apparatus that adjusts a sub-scanning regist up to the timing of an operation commencement signal from a regist sensor and an electrostatic latent image formation operation commencement and in which a succeeding operation commencement signal becomes active during electrostatic latent image formation, there is for example a so-called tandem-type color image forming apparatus in which the image formation units are aligned along a conveyer belt.

In such type of image forming apparatus, the tandem configuration comprises a circuit that takes image data from an image input apparatus and controls a timing between each color and a laser diode control board for each color. However, it is necessary to match the timing of the image input apparatus and the timing laser diode control boards of the individual colors.

Accordingly, such an image forming apparatus has two requirements:
(A) The sub-scanning write position is determined by the timing delay to the commencement of writing from the reference regist sensor. The timing of the data request to the image input apparatus and the timing of the commencement of the FGATE for the laser diode control board must be synchronized to a rotation of a polygon mirror.
(B) In order to achieve high-speed operation, a method of electrostatic latent image formation simultaneously over a plurality of lines using a plurality of laser diodes has come to be used. Additionally, there is such a thing as write resolution, and sometimes images are written using a resolution greater than that of the original image (for example a resolution of 1200 dpi as opposed to 600 dpi of the original image), so a magnification process sometimes is performed at the laser diode control boards.

However, making the circuit that takes image data from the image input apparatus and controls the timing between each color compatible with the variety of write laser diode control board configurations and operating modes described above increases the scale of the circuitry and complicates control, which is undesirable.

Additionally, conventionally, copiers, printers and the like are equipped with an image forming apparatus that performs cyclical line scans on a photosensitive surface that moves in a sub-scanning direction using a laser beam carrying image information. The image formation unit of the image forming apparatus is equipped with a laser diode control board that generates a write signal for driving a laser diode in response to image data to be written sent from the application board, and which generates write signal corresponding to various image data sent from different application boards, for example a printer controller, a copy application, a FAX application, and so forth.

However, even with the three types of applications used as examples above, resolution differs because of differences in function among the applications. For example, among printer controllers, resolutions of 1200, 600 and 300 dpi are standard, but among copier applications a resolution of 600 dpi is standard while among FAX applications resolution is not measured in terms of dpi but in terms of lines per mm. In short, image density is variegated. As a result, it is necessary that the laser diode control board of the image formation unit variably control a rotation speed of a polygon motor and the frequency with which the LD is lit. However, such adjustment is not easy, and complicates the process of carrying out accurate image formation for applications of so many different kinds.

A multiplication method that sets the write density of the image forming apparatus to a 1200 dpi that is a minimum multiple of the image density and that doubles the difference between the image density and the write density using a line memory is commonly in wide use. However, even employing such a method, the interface between the application board and image formation unit is not uniform and incompatibilities can arise, making accurate image formation difficult. Such difficulties are particularly pronounced in the formation of color images of the tandem type, in which it is necessary to adjust the write positions of each of the colors.

SUMMARY OF THE INVENTION

Accordingly, it is a general object of the present invention to provide an image forming apparatus in which the above-described drawbacks are eliminated.

Another and more specific object of the present invention is to provide an image forming apparatus in which drive timing control of a laser diode for accommodating different interfaces can be performed simply.

Another, further and more specific object of the present invention is to provide an image forming apparatus that uses a data transfer method that guarantees the above-described operation of (A) and that solves the above-described problem of (B).

Still another, further and more specific object of the present invention is to provide an image forming apparatus that provides superior application board expansion capabilities for producing image data to be written and that includes means for generating a laser write signal that can form an image of a quality suited to color image processing.

The above-described objects of the present invention are achieved by providing a color image forming apparatus for forming a color image on a storage medium using a laser beam generated from a laser generating means, the color image forming apparatus comprising:

a plurality of image data interfaces provided between the color image forming apparatus and a peripheral device;

image data interface conversion means for converting each of the image data interfaces into an image data interface for the laser generating means; and a single control means for controlling a drive timing of the laser generating means, the control means controlling the drive timing of the laser generating means for each one of a plurality of colors based on image data input from the image interface conversion means.

According to the above-described invention, by using a single control means for controlling the drive timing of the laser generating means for at least the plurality of colors, the laser generating means drive timing control means (which corresponds to the laser diode control boards that drive the laser diodes in the embodiments described below) can be simplified.

Additionally, the above-described objects of the present invention are also achieved by the color forming apparatus as described above, wherein at least one of the plurality of image data interfaces is a PCI interface.

According to the above-described invention, by using a universal interface for the image data interface the design burden relating to the image data interface can be lightened.

Additionally, the above-described objects of the present invention are also achieved by the color image forming apparatus as described above, wherein at least one of the plurality of image data interfaces is a parallel interface synchronized to a predetermined clock.

According to the above-described invention, by using a parallel interface that transfers data with high efficiency, overall data transfer efficiency can be improved.

Additionally, the above-described objects of the present invention are also achieved by the color image forming apparatus as described above, wherein an image data interface for a drive means for the laser generating means is a parallel interface synchronized to a predetermined clock.

According to the above-described invention, using a parallel interface as the image data interface for the drive means for the laser generating means improves performance, maintains printer performance even when data transfer rates are low and is resistant to radiated noise frequently generated when the data transmission path is lengthened.

Additionally, the above-described objects of the present invention are also achieved by the color image forming apparatus as described above, wherein the control means manages an image transfer from the plurality of image data interfaces.

According to the above-described invention, using the laser diode lighting timing control means to manage data transfer allows the color image forming apparatus buffer memory capacity to be reduced because means for originally storing the data does not perform this processing.

Additionally, the above-described objects of the present invention are also achieved by the color image forming apparatus as described above, wherein the control means controls the drive timing of the laser generating means of each one of the plurality of colors independently.

According to the above-described invention, setting the timing to the same reference clock outputs images in which there is no mispositioning between individual colors.

Additionally, the above-described objects of the present invention are also achieved by the color image forming apparatus as described above, wherein the control is carried out based on a scanning synchronization signal corresponding to each one of the plurality of colors.

According to the above-described invention, conducting control based on the scanning synchronization signal outputs images in which there is no mispositioning between individual colors.

Additionally, the above-described objects of the present invention are also achieved by an image forming apparatus for forming an image on a storage medium using a laser beam generated from a laser generating means, the color image forming apparatus comprising:

an adjustment component that adjusts a sub-scanning regist up to the timing of an operation commencement signal from a regist sensor and an electrostatic latent image formation operation commencement, such that a succeeding operation commencement signal becomes active during electrostatic latent image formation;

a scanning synchronization signal generating component;

an image effective interval signal generating component; and a line data synchronization signal generating component that generates a line data synchronization signal synchronized to image data of each line at least during an interval in which the image effective interval signal is active, the image forming apparatus using the scanning synchronization signal, the image effective interval signal and the line data synchronization signal to transfer data.

According to the above-described invention, data transfer can be carried out without affecting laser diode control board configuration or operating modes, and without increasing either the scale of the circuitry or the complexity of the control.

Additionally, the above-described objects of the present invention are also achieved by the image forming apparatus as described above, wherein an image delay in a sub-scanning direction is controlled based on the scanning synchronization signal.

According to the above-described invention, data transfer can be carried out without affecting laser diode control board configuration or operating modes, and without increasing either the scale of the circuitry or the complexity of the control.

Additionally, the above-described objects of the present invention are also achieved by the image forming apparatus as described above, wherein an image effective interval signal length is controlled based on the line data synchronization signal.

According to the above-described invention, data transfer can be carried out without affecting laser diode control board configuration or operating modes, and without increasing either the scale of the circuitry or the complexity of the control.

Additionally, the above-described objects of the present invention are also achieved by the image forming apparatus as described above, wherein the line data synchronization signal includes a pulse of identical timing with respect to the scanning synchronization signal.

According to the above-described invention, synchronizing the laser diode write operation and the data transfer simplifies laser diode control board control and can reduce the scale of the circuitry.

Additionally, the above-described objects of the present invention are also achieved by the image forming apparatus as described above, wherein the line data synchronization signal includes a pulse of different timing with respect to the scanning synchronization signal.

According to the above-described invention, more flexible data transfer methods can be achieved than is conventionally the case.

Additionally, the above-described objects of the present invention are also achieved by the image forming apparatus as described above, wherein the pulse timing is variable.

According to the above-described invention, it is possible to avoid a variety of restrictions on data transfer that exist for each type of operation.

Additionally, the above-described objects of the present invention are also achieved by the image forming apparatus as described above, wherein the line data synchronization signal includes a pulse having a timing that corresponds to a number of beams of a laser diode that forms an electrostatic latent image.

According to the above-described invention, transferring a plurality of lines at a time corresponding to a number of diode laser beams emitted within a polygon synchronization signal interval makes it possible to achieve high speed laser writing.

Additionally, the above-described objects of the present invention are also achieved by the image forming apparatus as described above, wherein the line data synchronization signal thins out a pulse according to a sub-scanning multiple.

According to the above-described invention, transfer density can be decreased according to a sub-scanning multiple, and further, according to a polygon synchronization signal, simplifying laser diode control board control and reducing the scale of the circuitry.

Additionally, the above-described objects of the present invention are also achieved by the image forming apparatus as described above, wherein the line data synchronization signal includes a pulse having a timing corresponding to a sub-scanning multiple and a number of beams of a laser diode that forms an electrostatic latent image.

According to the above-described invention, combining the laser diode beam number and sub-scanning multiple to produce complex data transfer increases design flexibility.

Additionally, the above-described objects of the present invention are also achieved by an image forming apparatus for forming an image on a storage medium using a laser beam generated from a laser generating means, the image forming apparatus comprising:

an image forming component that includes means for periodically line scanning in a scanning direction a photosensitive body movable in a sub-scanning direction with a laser beam carrying image data and exposing a photosensitive surface using the laser beam;

an application board that produces image data and transfers the image data so produced to the image forming component;

trigger signal generating means for generating a scanning line trigger signal and a sub-scanning effective region trigger signal for transferring at a predetermined timing the image data from the application board to the image forming component based on a laser beam scan synchronization signal;

communication means for communicating the scanning line trigger signal and the sub-scanning effective region trigger signal to the application board; and transferring means for generating a scanning line synchronization signal based on the communicated scanning line trigger signal and generating a sub-scanning effective region signal based on the sub-scanning effective region trigger signal, and transferring image data to the image forming component in synchrony with the scanning line synchronization signal and the sub-scanning effective region signal.

According to the above-described invention, images can be formed without having to include various data processing means in the image forming component (the laser diode control board) for correcting the laser diode exposure light position for each color in the case of a color image, combining image data and the like as is conventionally the case. Instead, such image processing means can be included in the application board (for example, the printer controller, copier application, facsimile application and the like) and the image data transfer timing generated from the image forming component. As a result, application board image memory can be effectively utilized, system-wide costs can be reduced, ease of application board expansion enhanced and images of high quality with no color blurring can be achieved.

Additionally, the above-described objects of the present invention are also achieved by the image forming apparatus as described above, wherein the transfer trigger signal generating means changes a period of a scanning line trigger signal to be produced according to a resolution of an image data produced by an application board.

According to the above-described invention, even when image data resolutions differ the laser diode write density can be fixed and image data can be produced that multiplies the scanning and sub-scanning resolutions at the laser diode control boards, and accordingly, write unit control can be simplified, permitting use of a simple interface that transfers image data at a rate of one line of image data for one scanning line synchronization signal.

Additionally, the above-described objects of the present invention are also achieved by the image forming apparatus as described above, wherein the transfer trigger signal generating means uses the interval in which the period of the scanning line trigger signal to be produced is changed as a period indicating an effective region of a sub-scanning effective region signal from the application board.

According to the above-described invention, the resolution and write density are only combined when the frame gate signal XIPUFGT output from the application boards is active, so the next print job can be quickly accommodated even when such job is generated quickly.

Other objects, features and advantages of the present invention will become more apparent from the following detailed description when read in conjunction with the accompanying drawings.

DESCRIPTION OF THE PREFERRED EMBODIMENTS

A description will now be given of preferred embodiments of the present invention, with reference to the accompanying drawings. It should be noted that identical or corresponding elements are given identical or corresponding reference numbers in all drawings, with detailed descriptions thereof given once and thereafter omitted.

Figure 1:
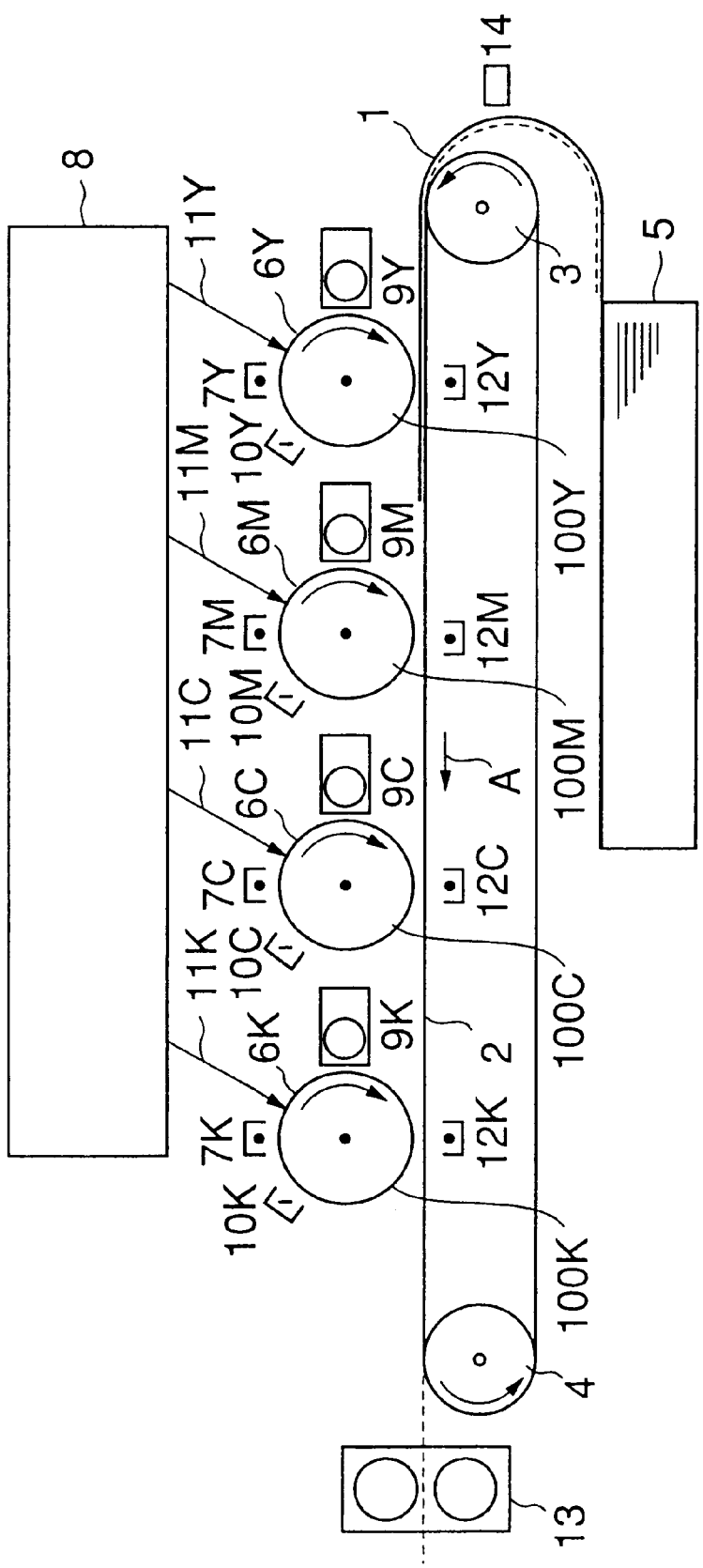
FIG. 1 is a diagram illustrating an example of an imaging process of an image forming apparatus according to a first embodiment of the present invention.

FIG. 1 is a diagram illustrating an example of an imaging process of an image forming apparatus according to a first embodiment of the present invention. The image forming apparatus of the present embodiment is a so-called tandem-type color image forming apparatus, in which picture forming units that correspond to individual colors are aligned along a conveyer belt.

In FIG. 1, first through fourth image forming units 100Y, 100M, 100C and 100K that form an image from four different colors indicated as Y for yellow, M for magenta, C for cyan and K for black are positioned so as to be aligned along a conveyer belt 2 that transports transfer paper 1 from an upstream side in a direction of transport to a downstream side. Ends of the conveyer belt 2 are stretched between a drive roller at one end that rotatingly drives and a driven roller at another end that is rotatably driven, such that the conveyer belt 2 is rotatably driven in a direction of an arrow A by transport rollers 3. A paper supply tray 5 containing the transfer paper 1 is provided below the conveyer belt 2. An uppermost sheet of the transfer paper 1 from among a bunch of sheets of transfer paper 1 contained in the paper supply tray 5 is supplied during image formation and suctionally attached atop the conveyer belt 2 by static electric attraction.

The transfer paper 1 so attached is transported to the first image forming unit 100Y (yellow), where image formation in yellow is carried out. The first image forming unit 100Y comprises a photosensitive drum 6Y and, around a periphery of the photosensitive drum 6Y, a charging unit 7Y, an exposure unit 8Y, a developer 9Y and a photosensitive drum cleaner 10Y. A surface of the photosensitive drum 6Y, after being charged to a uniform charge by the charging unit 7Y, is exposed by the exposure unit 8Y with a laser beam 11Y that corresponds to a yellow image, forming an electrostatic latent image.

The electrostatic latent image formed atop the photosensitive drum 6Y is developed by the developer 9Y and a toner image formed atop the photosensitive drum 6Y. The toner image is transferred by a transfer unit 12Y at a position at which the photosensitive drum 6Y and the transfer paper atop the conveyer belt 2 contact each other (hereinafter referred to as the contacting position) to form an image of a single color (in this case yellow) on the transfer paper 1. When transfer is completed, any excess toner remaining on the surface of the photosensitive drum 6Y is removed by the photosensitive drum cleaner 10Y in preparation for the next image formation. In this manner, the transfer paper 1 to which a single color (yellow) has been transferred by the first image forming unit 100 100Y is transported by the conveyer belt 2 to the second image forming unit 100M (magenta). Here, too, a toner image (in magenta) formed on a photosensitive drum 6M is similarly transferred to the transfer paper 1, on top of the image previously formed in yellow as described above. The transfer paper 1 is then further transported to the third image forming unit 100C (cyan) and the fourth image forming unit 100K (black), with toner images similarly formed being transferred so as to form a color image. When the transfer paper 1 has passed through the fourth image forming unit 100K and a color image has been formed, the transfer paper 1 is then peeled off the conveyer belt 2 and affixed to an affixing unit 13, after which the transfer paper 1 is expelled.

Figure 2:
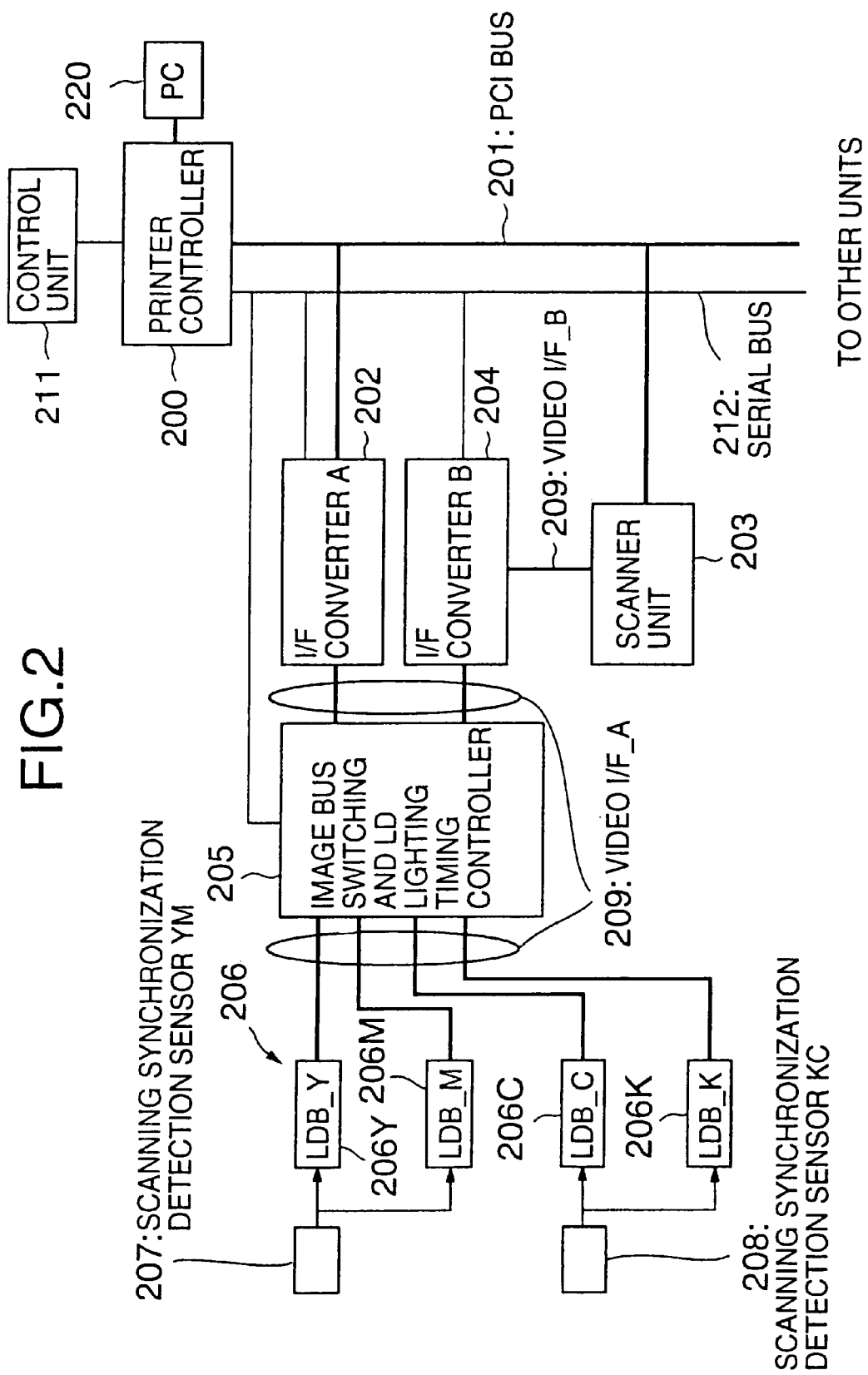
FIG. 2 is a block diagram illustrating a data flow when printing out from an image forming apparatus according to a first embodiment of the present invention.

FIG. 2 is a block diagram illustrating a data flow when printing out from an image forming apparatus according to a first embodiment of the present invention, that is, of the color image forming apparatus shown in FIG. 1. Printing may be of two types: Printing of data sent from a personal computer (hereinafter a PC), and printing of an image read from a scanner. Here, the color image forming apparatus of the present apparatus is equipped with interfaces (I/F) compatible with each of the two types of printing.

In other words, the color image forming apparatus of the present invention with respect to data flow comprises a printer controller 200, a first interface converter (I/F converter A in the drawing) 202 connected to the printer controller 200 via a PCI bus 201, a second interface converter (I/F converter B in the drawing) 204 connected to the printer controller 200 via the PCI bus 201 and scanner unit 203, an image bus switching and LD lighting timing controller (hereinafter sometimes referred to simply as a controller) 205, individual color LD drive blocks (shown in the drawing as laser diode control board) (shown in the drawing for each color as LDB_Y (206Y), LDB_M (206M), LDB_C (206C), LDB_K (206K)), a scanning synchronization detection sensor 207 that outputs a synchronization signal to the yellow and magenta LDB_Y (206Y) and LDB_M (206M), respectively, a scanning synchronization detection sensor 208 that outputs a synchronization signal to the cyan and black LDB_C (206C) and LDB_K (206K), respectively, a first parallel interface 209 provided on each of the front and back stages of the controller 205, a second parallel interface 210 (shown in the diagram as VIDEO I/F_B) provided between the scanner 203 and the second I/F converter 204, and a control unit 211 for inputting instructions to the printer controller 200. It should be noted that each of the LDB 206 corresponds to the exposure units 8 of the imaging process of FIG. 1. Additionally, the PC 220 is connected to the printer controller 15 using a predetermined universal interface, the first and second interface converters 202, 204 and the controller 205 are connected to the printer controller by the serial bus 212.

A description will now be given of the flow of data printed by the above-described imaging process.

(1) When printing from the PC

When a print command is issued from the PC 220, the printer controller 200 sets each unit to print and carries out printing via the PCI bus 201 and predetermined serial bus 212.

The image data received by the printer controller 200 is input to the I/F converter 202 via the PCI bus 201, where the image data is converted to the parallel interface (VIDEO I/F A) 209 synchronized to a predetermined clock from the PCI interface and transferred to the image bus switching and LD lighting timing controller 205.

(2) When printing data read from the scanner

When the control unit 211 is connected to the printer controller 200 and a variety of settings are carried and image data read by the scanner unit 202 is printed, that is, when the apparatus is used as a copier, a start print command is issued. When a copy start request is thus made, the printer controller 200 sets each unit to print and carries out printing via the PCI bus 201 and predetermined serial bus 212. A variety of setting instructions and instructions to begin reading a document are also issued to the scanner unit 202. The data read by the scanner unit 202 is then once read into an image memory unit, hard disk or the like (not shown in the diagram) inside the printer controller via the PCI bus 201 and then returned to the scanner unit 212 via the PCI bus 201, where the data undergoes predetermined image processing and is input to the second interface converter 204. As described above, the scanner unit 202 and the second interface converter 204 are connected by the second parallel interface (VIDEO I/F_B) 210 synchronized to the predetermined clock. At the second interface converter 204, the data undergoes interface conversion to the first VIDEO I/F_A 209 described above, and the data as well as a control signal are then transferred to the controller 205.

In either case (1) or (2) as described above, past the image bus switching and LD lighting timing controller 205, data as well as control signals are forwarded by the first VIDEO I/F_A 209 to the LDB 206 for exposing each color. In other words, the LD lighting timing controller is common between the first and the second interface converters 202, 204 described above.

A description will now be given of an operation of the LD lighting timing controller 205 when taking in image data. In the present embodiment, the yellow and magenta colors Y, M use the first scanning synchronization detection sensor 207 in common. Similarly, the black and cyan colors K, C use the second first scanning synchronization detection sensor 208 in common.

(1) When printing from the PC

Figure 3:
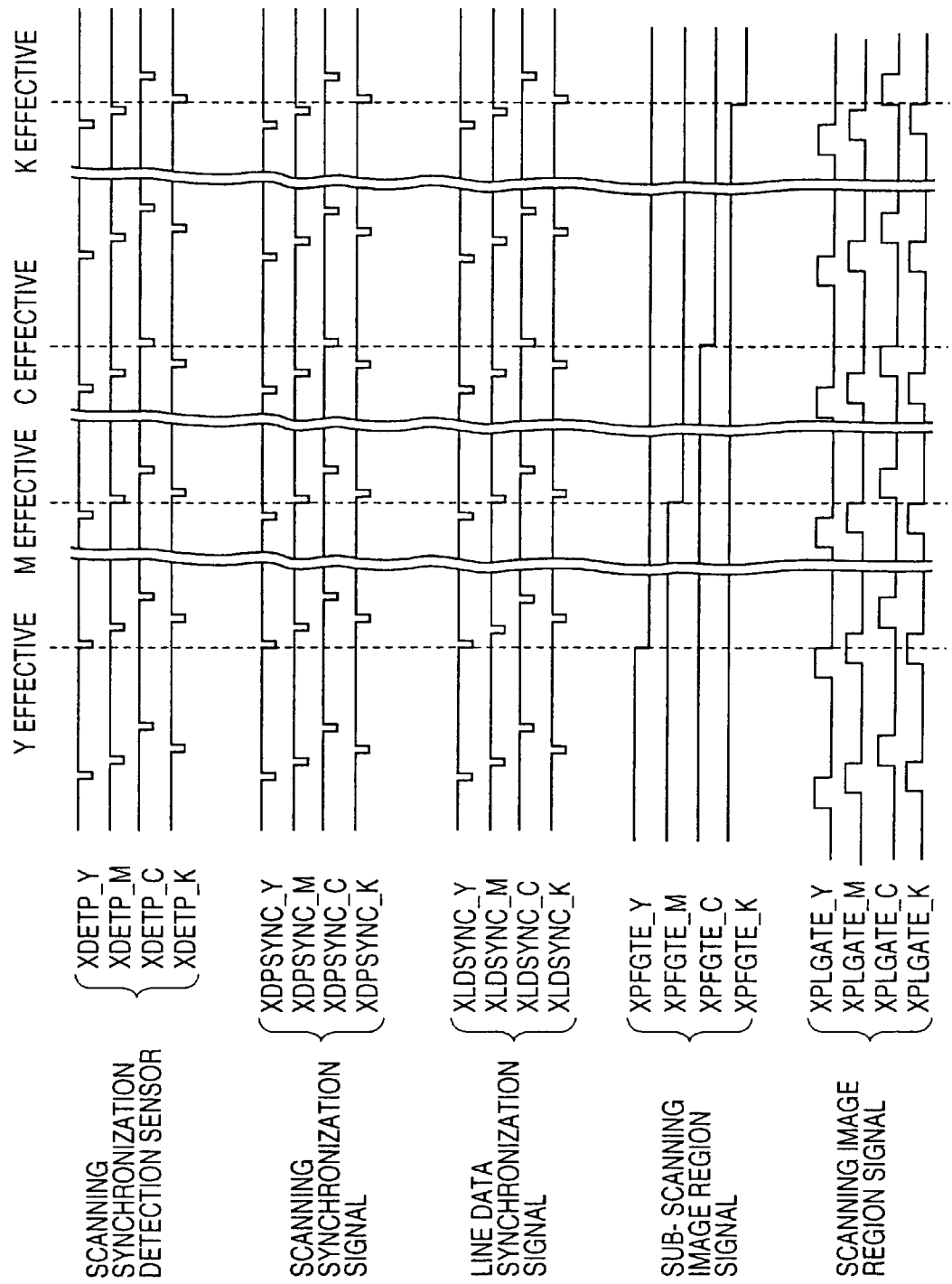
FIG. 3 is a timing chart showing an operation timing when printing from a PC.

FIG. 3 is a timing chart showing an operation timing when printing from a PC. Detection signals from the first scanning synchronization detection sensor YM 207 and the second scanning synchronization detection sensor KC 208 of FIG. 2 are given as XDETP_Y, XDETP_M, XDETP_C and XDETP_K. Each signal is input to each LDB 206 individually and asynchronously. Additionally, scanning synchronization signals XDPSYNC_Y, XDPSYNC_M, XDPSYNC_C and XDPSYNC_K corresponding to and synchronous with the signals XDETP_Y, XDETP_M, XDETP_C and XDETP_K are generated.

Further, line data synchronization signals XLDSYNC_Y, XLDSYNC_M, XLDSYNC_C and XLDSYNC_K are generated from the scanning synchronization signals XDPSYNC_Y, XDPSYNC_M, XDPSYNC_C and XDPSYNC_K. These signals are signals that enable one line of data to be read once, and in sub-scanning multiple processing and multibeam systems serve to thin out the scanning synchronization signals, and further, are output at a phase different from the phases of the scanning synchronization signals. The timing chart shown in FIG. 3 is for a non-multiple sub-scan, single laser diode mode.

When taking in data from the print controller 200, such data is taken in via the first interface converter 202 based on the line data synchronization signals XLDSYNC_Y, XLDSYNC_M, XLDSYNC_C and XLDSYNC_K. The data read in is then synchronized to a transfer clock and transferred to the LDB 206 for each color via the first parallel interface (VIDEO I/F_A) 209 together with sub-scanning image region signals XPFGATE_Y, XPFGATE_M, XPFGATE_C, XPFGATE_K generated in synchrony with scanning synchronization signals XDPSYNC_Y, XDPSYNC_M, XDPSYNC_C and XDPSYNC_K and with scanning image region signals XPLGATE_Y, XPLGATE_M, XPLGATE_C and XPLGATE_K generated in synchrony with line data synchronization signals XLDSYNC_Y, XLDSYNC_M, XLDSYNC_C and XLDSYNC_K, thereby effecting exposure by the laser diodes.

(2) When printing data read from the scanner

Figure 4:
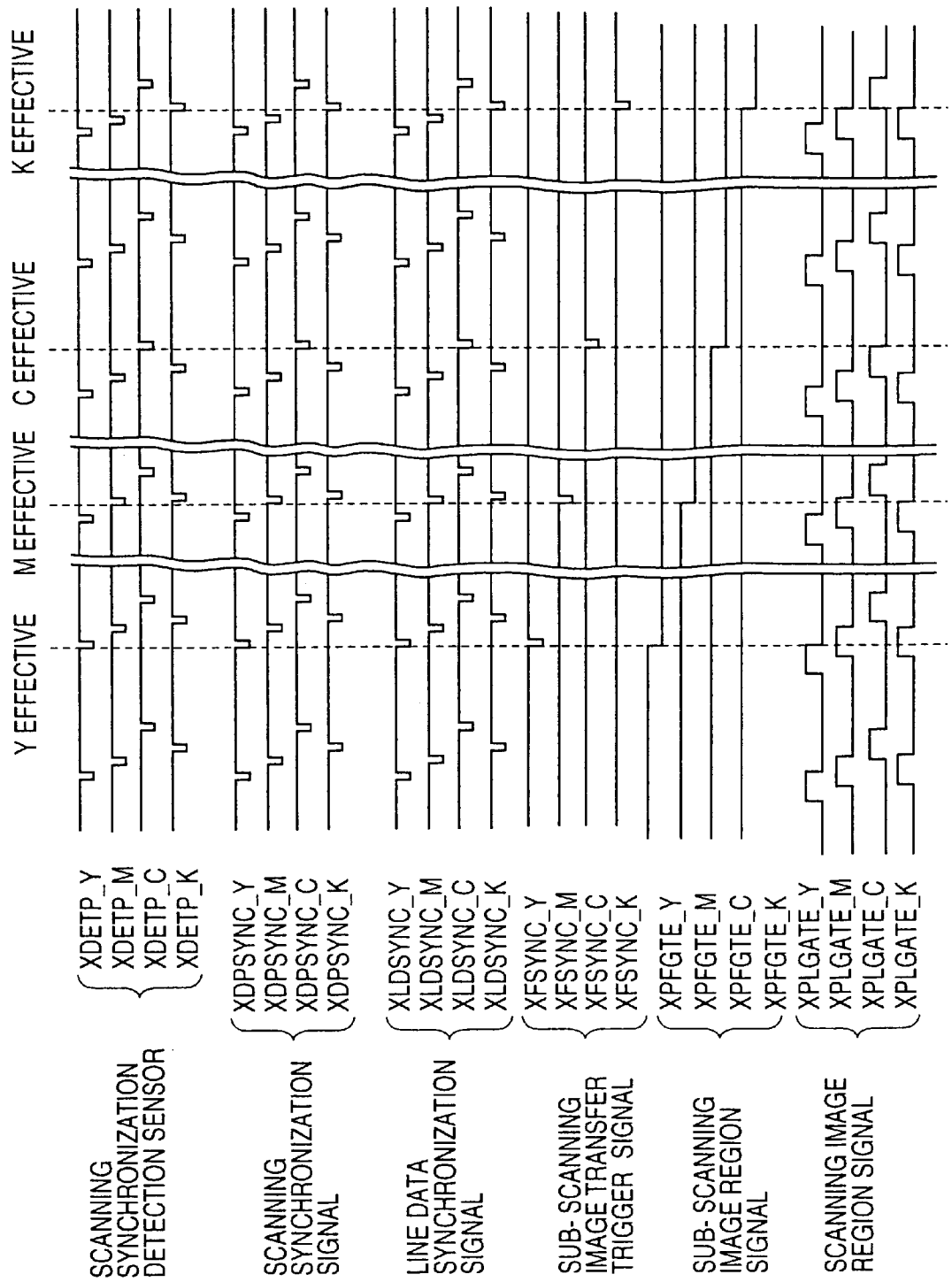
FIG. 4 is a timing chart showing an operation timing when printing data read from a scanner.

FIG. 4 is a timing chart showing an operation timing when printing data read from a scanner. Detection signals from the first scanning synchronization detection sensor YM 207 and the second scanning synchronization detection sensor KC 208 of FIG. 2 are given as XDETP_Y, XDETP_M, XDETP_C and XDETP_K. Each signal is input individually and asynchronously. Additionally, scanning synchronization signals XDPSYNC_Y, XDPSYNC_M, XDPSYNC_C and XDPSYNC_K are generated from and in synchrony with the scanning synchronization detection sensor output signals XDETP_Y, XDETP_M, XDETP_C and XDETP_K, respectively.

Further, line data synchronization signals XLDSYNC_Y, XLDSYNC_M, XLDSYNC_C and XLDSYNC_K are generated from the scanning synchronization signals XDPSYNC_Y, XDPSYNC_M, XDPSYNC_C and XDPSYNC_K. These signals are signals that enable one line of data to be read once, and in sub-scanning multiple processing and multibeam systems serve to thin out the scanning synchronization signals, and further, are output at a phase different from the phases of the scanning synchronization signals. Additionally, sub-scanning image transfer trigger signals XFSYNC_Y, XFSYNC_M, XFSYNC_C and XFSYNC_K are generated from the line data synchronization signals XLDSYNC_Y, XLDSYNC_M, XLDSYNC_C and XLDSYNC_K, respectively. The timing chart shown in FIG. 4 is for a non-multiple sub-scan, single laser diode mode.

When taking in data from the scanner unit 202, the line data synchronization signals as well as the sub-scanning image transfer trigger signals are transmitted via the second interface converter 204 and the VIDEO I/F_B 210, and conversely data is synchronized to the transfer clock and read in together with the sub-scanning image region signals XPFGATE_Y, XPFGATE_M, XPFGATE_C, XPFGATE_K as well as the scanning image region signals XLGATE_Y, XLGATE_M, XLGATE_C and XLGATE_K from the scanner unit 22. The data read in is then synchronized to a transfer clock and transferred to the LDB 206 for each color via the first serial interface (VIDEO I/F_A) 209 together with sub-scanning image region signals XPFGATE_Y, XPFGATE_M, XPFGATE_C and XPFGATE_K and with scanning image region signals XPLGATE_Y, XPLGATE_M, XPLGATE_C and XPLGATE_K, thereby effecting exposure by the laser diodes.

It should be noted that the control of the timing of the lighting of the individual laser diodes is carried out independently for each color based on the scanning synchronization signals XDPSYNC_Y, XDPSYNC_M, XDPSYNC_C and XDPSYNC_K.

A description will now be given of an image forming apparatus according to a second embodiment of the present invention, with reference in the first instance to FIG. 5. The second embodiment has the same structure as the first embodiment described above with reference to FIG. 1, and so an explanation thereof shall be omitted.

Figure 5:
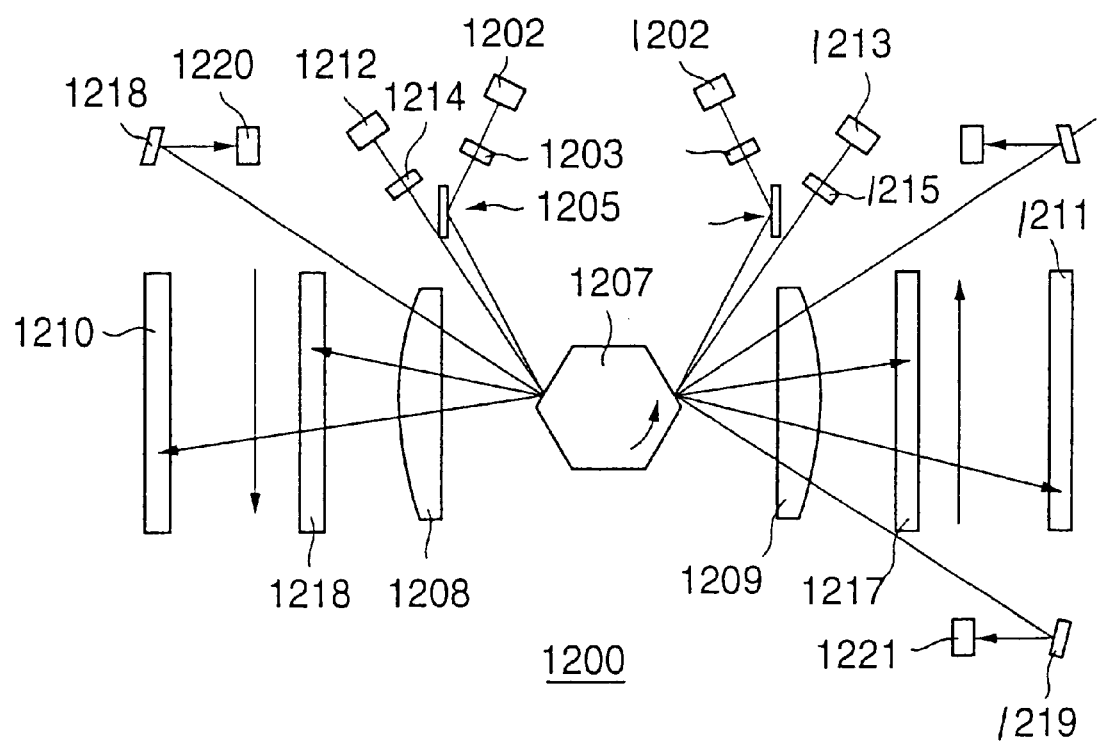
FIG. 5 is a plan view of an optical unit used in an image forming apparatus according to a second embodiment of the present invention.

FIG. 5 is a plan view of an optical unit used in an image forming apparatus according to a second embodiment of the present invention. It should be noted that elements of the second embodiment not described below should be understood as being identical to corresponding elements of the image forming apparatus according to the first embodiment of the present invention as described above, and accordingly a description thereof is omitted for economy of explanation.

In an optical unit 1200 as shown in the diagram, laser beams from a laser diode unit K 1201 and a laser diode unit Y 1202 pass through cylinder lenses 1203, 1204 and are directed to a lower surface of a polygon mirror 1207 by a first reflecting mirror K 1205 and a second reflecting mirror Y 1206, such that a rotation of the polygon mirror 1207 deflects the laser beams through an fθ lens KC 1208 as well as through an fθ lens Y M1209, where the beams are then reflected back by a first mirror K 1210 and a first mirror Y 1211. At the same time, laser beams from a laser diode unit C 1212 and a laser diode unit M 1213 pass through cylinder lenses C 1214 and M 1215 and are directed to an upper surface of the polygon mirror 1207, such that a rotation of the polygon mirror deflects the laser beams through the fθ lens KC 1208 as well as through the fθ lens YM 1209, where the beams are then reflected back by a first mirror C 1216 and a first mirror M 1217.

Additionally, a cylinder mirror KC 1218 and a cylinder mirror YM 1219 as well as a sensor KC 1220 and a sensor YM 1221 are provided upstream from a write start position in a scanning direction. The laser beams that pass through the fθ lens KC 1208 as well as through the fθ lens YM 1209 are reflected and concentrated by the cylinder mirror KC 1218 as well as the cylinder mirror YM 1219 and directed onto the sensor KC 1220 and the sensor YM 1221. These sensors are synchronization detection sensors for taking a synchronization of a scanning direction.

Additionally, the laser beams from the laser diode unit K 1201 and the laser diode unit C 1212 are used by the common cylinder mirror KC 1218 as well as the sensor KC 1220. The same goes for the laser diode unit Y 1202 and the laser diode unit M 1213. Light of two different colors enters the same lens, so by altering the angle at which light of each color strikes the polygon mirror 1207 the timing with which the individual laser beams enter the sensor is changed and a pulse train can be serially output. As can be understood from the diagram, K and C as well as Y and M are scanned in a reverse direction.

The lighting timing controller 1300 of the image forming apparatus having the structure described above is shown in FIG. 6 and FIG. 7.

Figure 6:
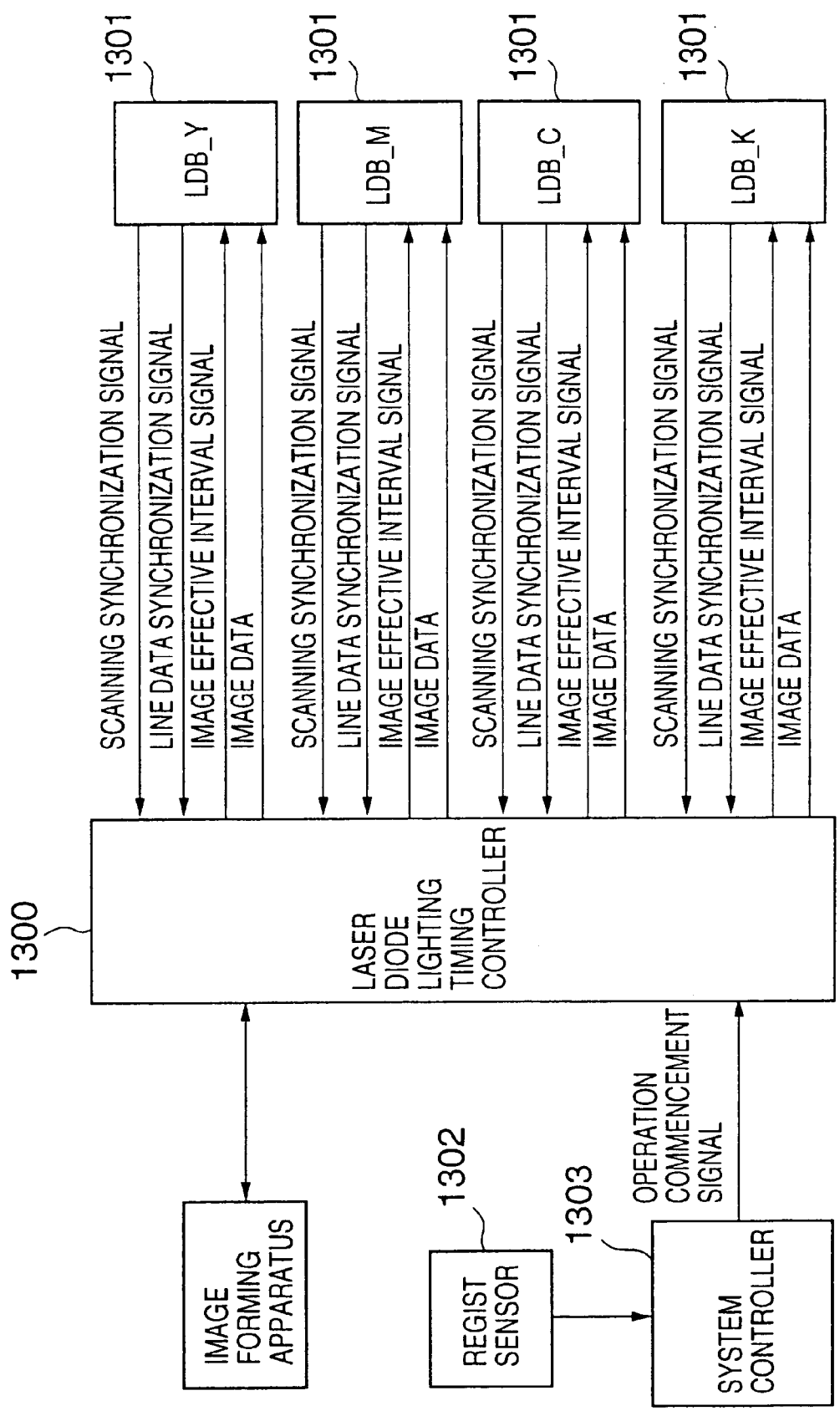
FIG. 6 is a diagram showing an interface between a laser diode lighting timing controller and the laser diode control boards of each color as used in an image forming apparatus according to a second embodiment of the present invention.
Figure 7:
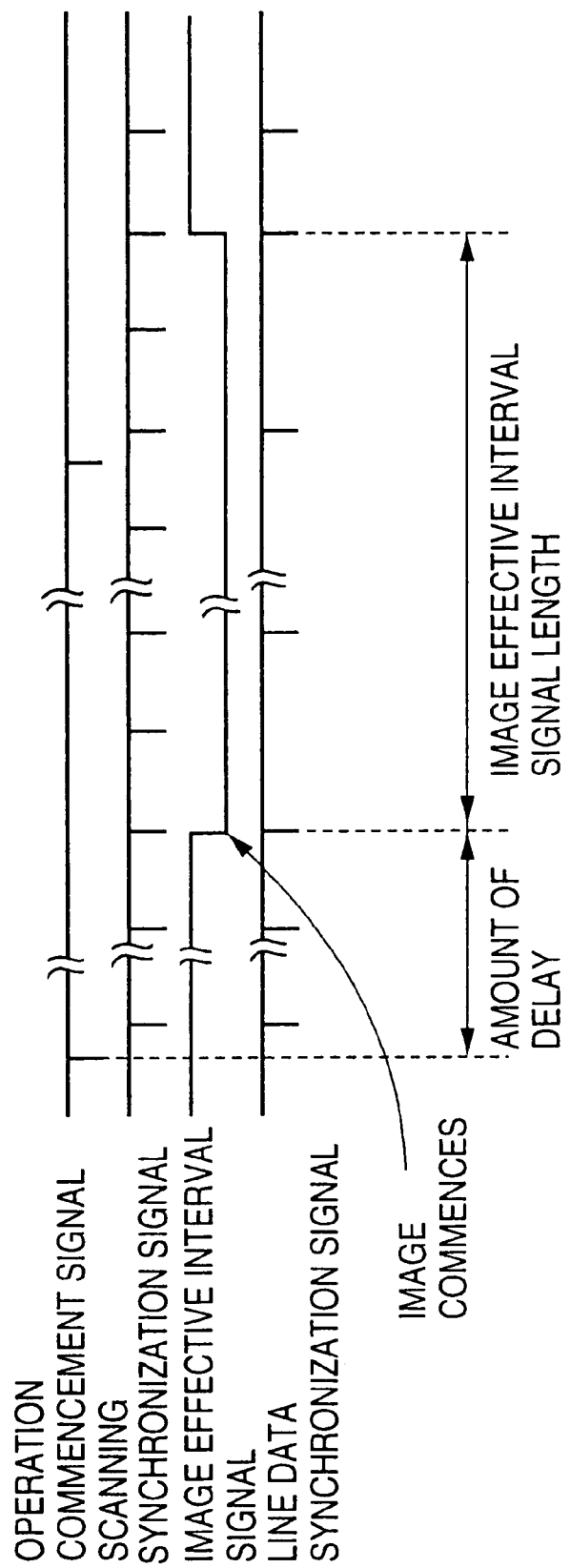
FIG. 7 is a diagram showing a timing of the interface of FIG. 6.

FIG. 6 is a diagram showing an interface between a laser diode lighting timing controller 1300 and the laser diode control boards 1301 of each color as used in an image forming apparatus according to a second embodiment of the present invention. FIG. 7 is a diagram showing a timing of the interface of FIG. 6.

As shown in the diagrams, scanning synchronization signals and line data synchronization signals are sent from the laser diode control boards 1301 of each color to the laser diode lighting timing controller 1300, and image effective interval signals and image data are sent from the laser diode lighting timing controller 1300 to the laser diode control boards 1301 of each color. The scanning synchronization signals are signals separated by color based on the synchronization detection sensor output of FIG. 2, and become active once per one surface of the polygon mirror 1207. The laser diode lighting timing controller 1300 generates an image effective interval signal using as a reference an operation commencement signal generated by a system controller 1303 based on an output of a regist sensor 1302 and informs the laser diode control boards 1301 of each color of the latent image formation timing.

The laser diode control boards 1301 generate line data synchronization signals each time one line of data is needed and transmit those signals to the laser diode lighting timing controller 1300 at least while the image effective interval signal is active. The laser diode lighting timing controller 1300 switches the image effective interval signal to inactive after transfer of the necessary number of lines of data is completed. By such series of processes is data transfer made possible. Data transfer is accomplished in particular by generating a commencement timing of the image effective interval signal that expresses the amount of delay in the image based on the scanning synchronization signals, as shown in FIG. 7. Additionally, data transfer is accomplished in particular by generating the image effective interval signal based on the line data synchronization signals, as shown in FIG. 7.

Figure 8:
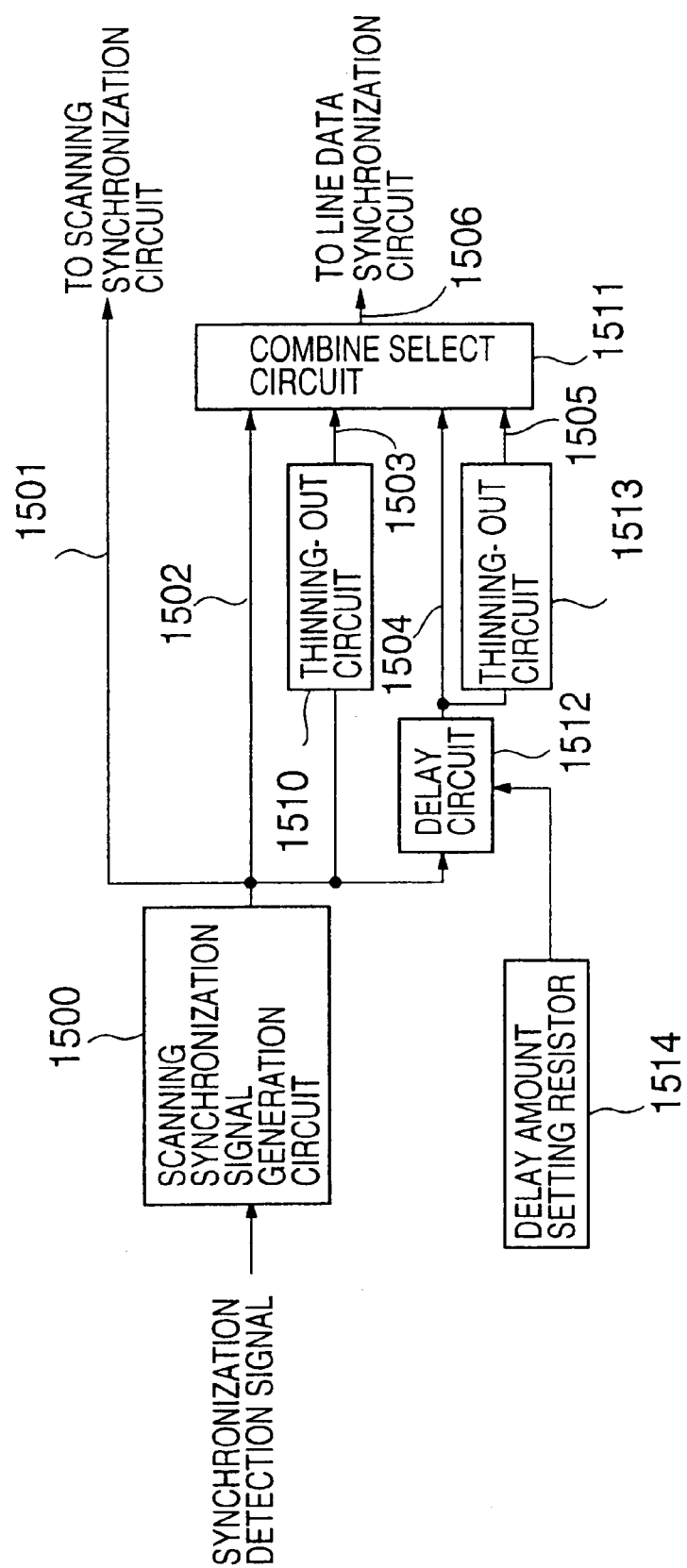
FIG. 8 is a block diagram of an image forming apparatus according to a third embodiment of the present invention.

FIG. 8 is a block diagram of an image forming apparatus according to a third embodiment of the present invention.

As shown in the diagram, in the present embodiment, scanning synchronization signals 1501, 1502 are generated by a scanning synchronization signal generating circuit 1500 based on a synchronization detection signal. An output 1503 is produced from the scanning synchronization signals 1501, 1502 through a thinning-out circuit 1510 that periodically makes an active pulse inactive. A line data synchronization signal 1506 is made to include a pulse of the same timing as the scanning synchronization signals 1501, 1502 by selecting a signal 1502 or a signal 1503 at a combine/select circuit 1511.

Additionally, there is a signal 1504 that imparts a delay to the output of the scanning synchronization signal generating circuit 1500, and further, an output 1505 of a thinning-out circuit 1513 that periodically makes an active pulse of an output of a delay circuit 1512 inactive. The line data synchronization signal 1506 can be made to include a pulse of a timing different from the scanning synchronization signals 1501, 1502 by selecting the signal 1504 or the signal 1505 at the combine/select circuit 1511. Further, the delay circuit 1512 of FIG. 8 is configured so that a delay amount is determined on the basis of a value of a delay amount setting regist 1514, so the timing of the pulse of the signal 1504 is variable.

A description will now be given of another operation of the embodiment described above, with reference to FIG. 8 and FIG. 9.

Figure 9:
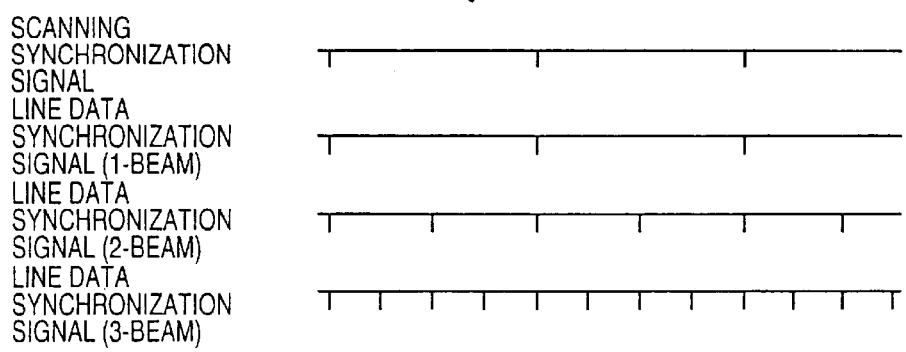
FIG. 9 is a diagram showing a line data synchronization signal corresponding to a number of beams of a laser diode and a scanning synchronization signal of an image forming apparatus according to a third embodiment of the present invention.

FIG. 9 is a diagram showing a line data synchronization signal corresponding to a number of beams of a laser diode and a scanning synchronization signal of an image forming apparatus according to a third embodiment of the present invention.

It should be noted that in the example shown in FIG. 9 there is no multiplication of the sub scanning, that is, the example involves a case of sub-scanning 1×. When writing one beam, the data necessary for the laser diode control board 1301 is one line per one surface of the polygon mirror 1207, so the scanning synchronization signals 1501, 1502 and the line data synchronization signal 1506 may be the same. That is, it is acceptable to select the signal 1502 of FIG. 8 and output the signal 1506. When writing two beams, the data necessary for the laser diode control board 1301 is two lines per surface of the polygon mirror 1207, so the line data synchronization signal 1506 must be given twice for every one scanning synchronization signal. Thus, for example, it is acceptable to combine the signal 1502 and the output 1504 of the delay circuit of FIG. 8 so as to output the signal 1506. When writing four beams, the data necessary for the laser diode control board 1301 is four lines per surface of the polygon mirror 1207, so the line data synchronization signal 1506 must be given four times for every scanning synchronization signal. Though not shown in FIG. 8, it is acceptable to provide and combine a plurality of delay circuits like the delay circuit 1512 shown in FIG. 8 so as to output the signal 1506. Thus, a pulse of a timing different from the scanning synchronization signal and corresponding to the number of laser diode beams is included in the line data synchronization signal.

A description will now be given of still another operation of the embodiment described above, with reference to FIG. 8 and FIG. 10.

Figure 10:
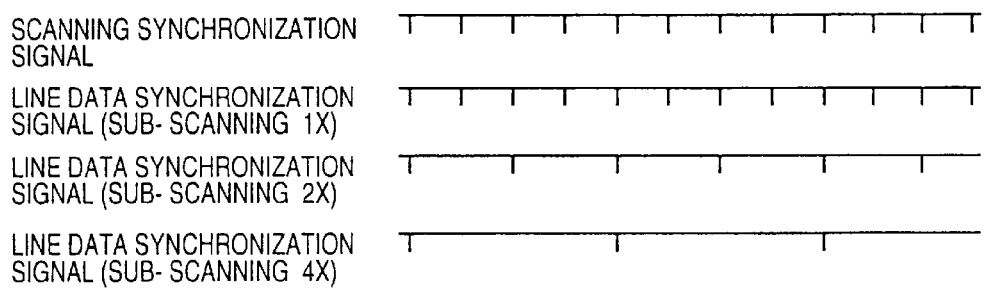
FIG. 10 is a diagram showing a line data synchronization signal corresponding to a sub-scanning multiple and a scanning synchronization signal of an image forming apparatus according to a third embodiment of the present invention.

FIG. 10 is a diagram showing a line data synchronization signal corresponding to a sub-scanning multiple and a scanning synchronization signal of an image forming apparatus according to a third embodiment of the present invention.

In the example shown in FIG. 10, there is only one laser diode beam. Accordingly, when no multiplication of the sub scanning is performed, that is, in a case of a sub-scanning multiple of 1×, the data necessary for the laser diode control board 1301 is one line per one surface of the polygon mirror 1207, so the scanning synchronization signals 1501, 1502 and the line data synchronization signal 1506 may be the same. That is, it is acceptable to select the signal 1502 of FIG. 8 and output the signal 1506. When multiplying the sub scanning, that is, in a case of a sub-scanning multiple of 2×, the data necessary for the laser diode control board 1301 is one line per two surfaces of the polygon mirror 1207, so the line data synchronization signal 1506 must be given once for every two scanning synchronization signals. Thus, for example, it is acceptable to thin out at the thin-out circuits 1510, 1513 at a rate of once every two times so as to output the signal 1506. When quadrupling the sub scanning, that is, in a case of a sub-scanning multiple of 4×, the data necessary for the laser diode control board 1301 is one line per four surfaces of the polygon mirror 1207, so the line data synchronization signal 1506 must be given once for every four scanning synchronization signals. Thus, for example, it is acceptable to thin out at the thin-out circuits 1510, 1513 at a rate of thrice every four times so as to output the signal 1506. Thus, a thinning out with a pulse of a timing that is the same as the scanning synchronization signal and corresponding to the sub-scanning multiple is included in the line data synchronization signal.

A description will now be given of still another and further operation of the embodiment described above, with reference to FIG. 8 and FIG. 11.

Figure 11:
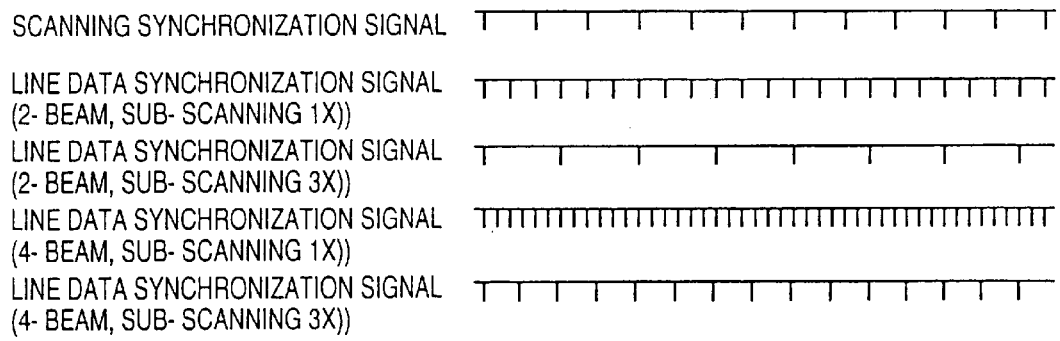
FIG. 11 is a diagram showing a line data synchronization signal corresponding to a sub-scanning multiple and a number of beams of a laser diode and a scanning synchronization signal of an image forming apparatus according to a third embodiment of the present invention.

FIG. 11 is a diagram showing a line data synchronization signal corresponding to a sub-scanning multiple and a number of beams of a laser diode and a scanning synchronization signal of an image forming apparatus according to a third embodiment of the present invention.

In the example shown in FIG. 11, when writing two beams at a sub-scanning multiple of 1×, the data necessary for the laser diode control board 1301 is two lines per surface of the polygon mirror 1207, so the line data synchronization signal 1506 must be given twice for every scanning synchronization signal. Thus, for example, it is acceptable to combine the signal 1502 and the output 1504 of the delay circuit of FIG. 8 so as to output the signal 1506. When writing two beams at a sub-scanning multiple of 3×, the data necessary for the laser diode control board 1301 is two lines per three surfaces of the polygon mirror 1207, so the line data synchronization signal 1506 must be given twice for every three scanning synchronization signals. Thus, for example, it is acceptable to combine the output of the signal 1503 (thinned out twice every three times) and the signal 1505

(thinned out twice every three times) of FIG. 8 so as to output the signal 1506. When writing four beams at a sub-scanning multiple of 1×, the data necessary for the laser diode control board 1301 is four lines per surface of the polygon mirror 1207, so the line data synchronization signal 1506 must be given four times for every scanning synchronization signal. Thus, for example, though not shown in FIG. 8, it is acceptable to provide and combine three of the delay circuits shown in FIG. 8 so as to output the signal 1506. When writing four beams at a sub-scanning multiple of 3×, the data necessary for the laser diode control board 1301 is four lines per every three surfaces of the polygon mirror 1207, so the line data synchronization signal 1506 must be given four times for every three scanning synchronization signals. Thus, for example, it is acceptable to combine the signal 1503 (thinned out twice every three times) and the signal 1505 (thinned out twice every three times) of FIG. 8, to provide a circuit that generates the signal 1505 (though not shown in FIG. 8) and two further similar delay circuits (not shown in FIG. 8), and to combine four signals so as to output the signal 1506.

Thus, a pulse of a timing identical to and a pulse of a timing different from the scanning synchronization signal and corresponding to the number of laser diode beams and to the sub-scanning multiple is included in the line data synchronization signal.

According to the image forming apparatus described above, by independently providing both a polygon synchronization signal timed to match the beginning of the sub scanning and an image data synchronization signal for when the laser diode control board requires a line of data, data transfer can be carried out without affecting laser diode control board configuration or operating modes, and without increasing either the scale of the circuitry or the complexity of the control.

Next, a description will be given of the circuit that controls the operation of each one of the laser diode units that form the compositional elements of the above-described optical unit, with reference in the first instance to FIG. 12.

A description will now be given of an image forming apparatus according to a fourth embodiment of the present invention, with reference in the first instance to FIG. 12. It should be noted that the fourth embodiment has the same structure as the first and second embodiments described above with reference to FIG. 1 and FIG. 5, and so an explanation thereof shall be omitted.

Figure 12:
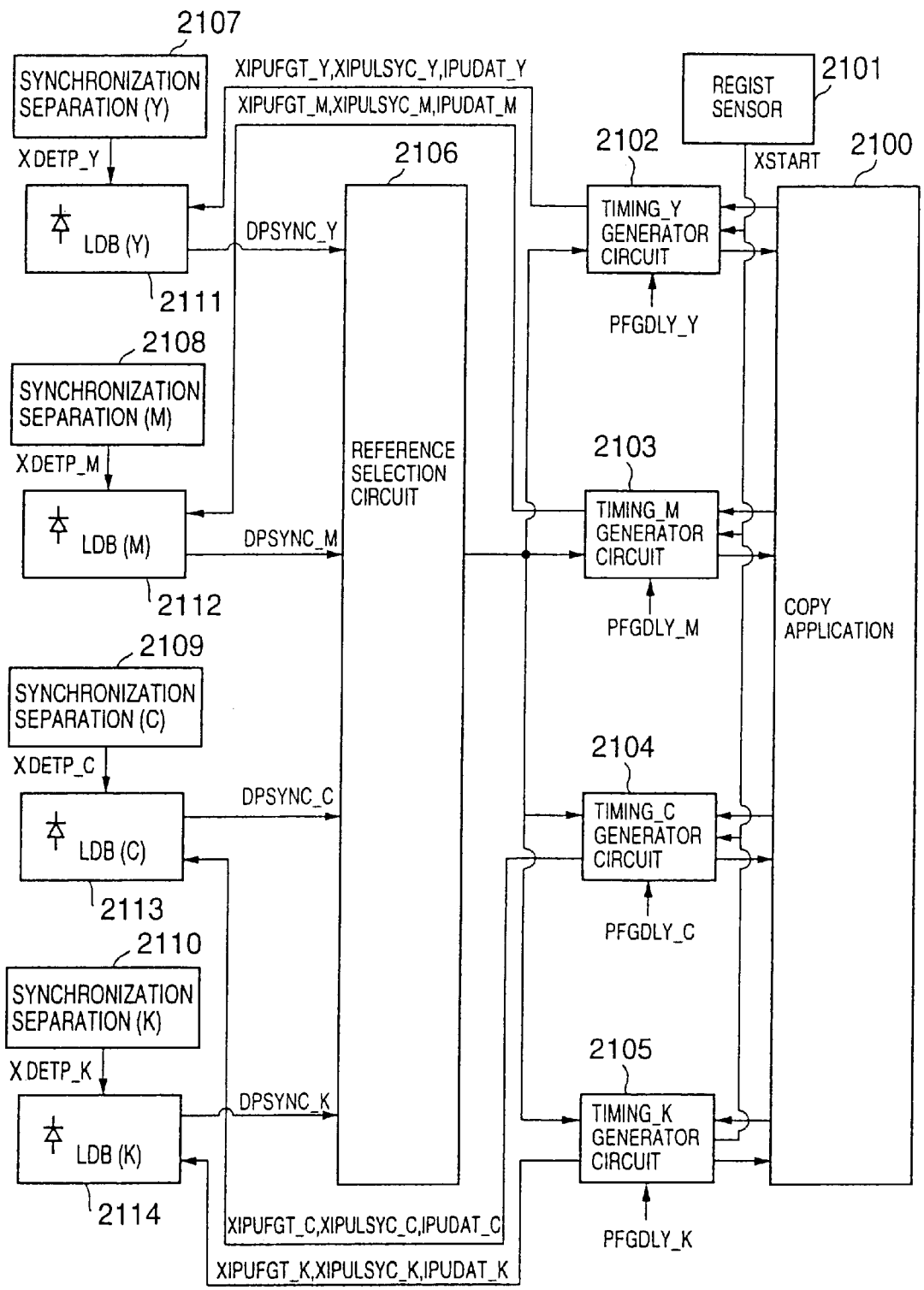
FIG. 12 is a block diagram of a control circuit having an interface for transmitting image data to a laser diode control board of an image forming apparatus according to a fourth embodiment of the present invention.

FIG. 12 is a block diagram showing a composition of a control circuit having an interface for transmitting image data to a laser diode control board of an image forming apparatus according to a fourth embodiment of the present invention.

As shown in FIG. 12, a control circuit 2000 comprises a reference selection circuit 2106 as an interface between a copy application 2100 laser diode control boards 2111, 2112, 2113 and 2114 provided for each of the colors Y, M, C and K, and timing generator circuits 2102, 2103, 2104 and 2105 for each of the colors Y, M, C and K. The reference selection circuit 2106 generates a reference signal for matching the phases of the write signals of the colors Y, M, C and K. The individual timing generator circuits 2102, 2103, 2104 and 2105 for each of the colors generate scanning line trigger signals and sub-scanning effective region trigger signals as timing signals for the transfer of image data for each color and communicates these trigger signals to the copy application 2100.

The copy application 2100 produces write image data keyed to the timing signals for each color from previously produced image data communicated to the copy application 2100, and transfers the write image data to each of the laser diode control boards 2111, 2112, 2113 and 2114 that control the lighting of the laser diodes that carry out laser beam writing at the image forming apparatus main unit.

Additionally, synchronization separation circuit (Y) 2107 and synchronization separation circuit (M) 2108 are circuits that separate the synchronization signals of each color output from the synchronization signal detection sensor YM 1221 shown in FIG. 5 above. Similarly, synchronization separation circuit (C) 2109 and synchronization separation circuit (K) 2110 are circuits that separate the synchronization signals of each color output from the synchronization signal detection sensor KC 1220 shown in FIG. 5 above.

The laser diode control board (Y) 2111 is contained within the laser diode unit Y 1202 shown in FIG. 5 above. Similarly, the laser diode control boards (M) 2112, (C) 2113 and (K) 2114 are contained within the laser diode units M 1213, C 1212 and K 1201, respectively.

A description will now be given of one operation of the control circuit shown in FIG. 12, with reference to FIG. 13.

Figure 13:
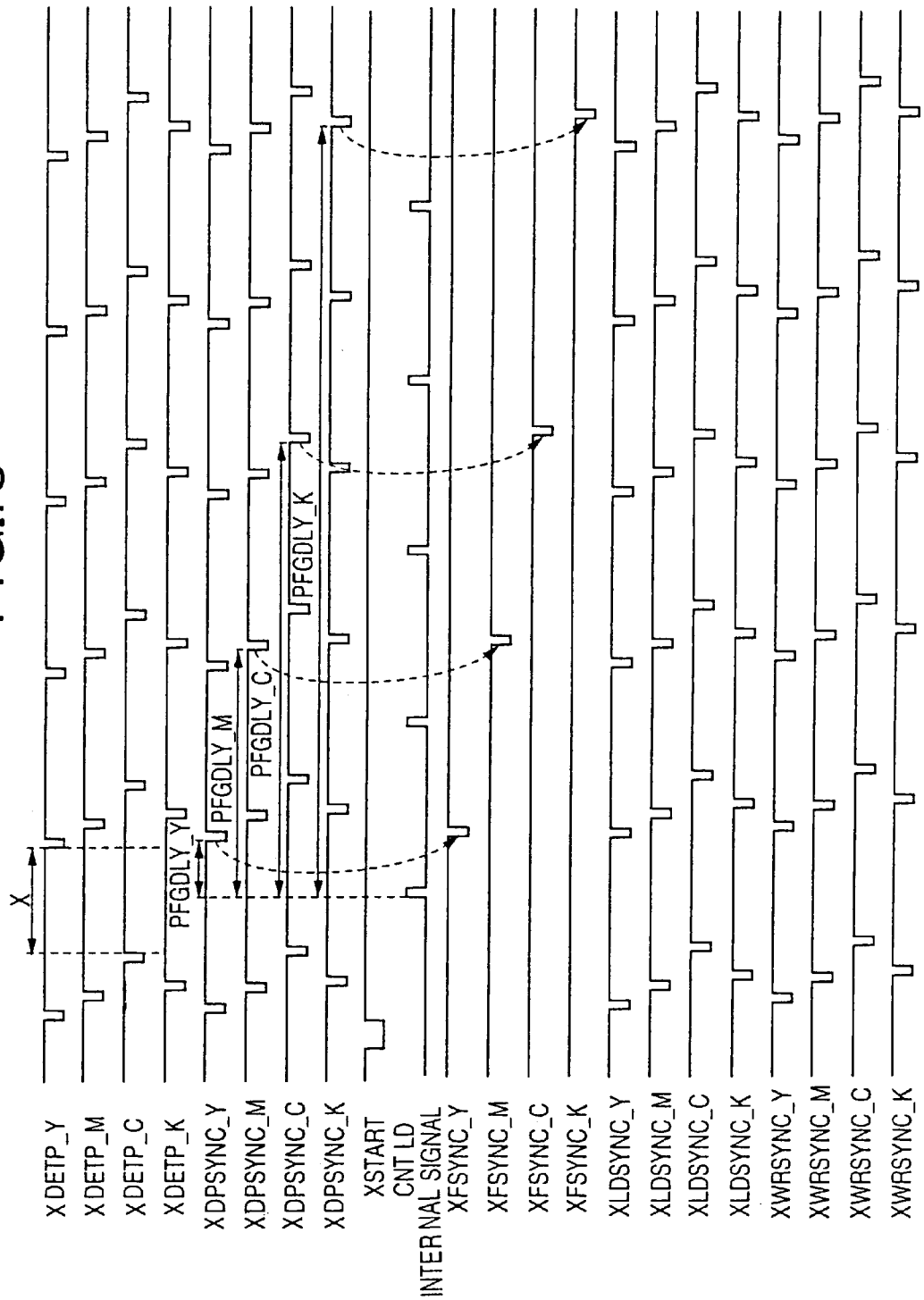
FIG. 13 is a timing chart showing an operation of the control circuit shown in FIG. 12.

FIG. 13 is a timing chart showing an operation of the control circuit shown in FIG. 12.

Synchronization signals corresponding to line scans from the synchronization separation circuits 2107–2110 for each color are output for every line. That is, a synchronization signal DETP_Y from the synchronization separation circuit (Y) 2107, DETP_M from the synchronization separation circuit 2108 (M), DETP_C from the synchronization separation circuit 2109 (C) and DETP_K from the synchronization separation circuit 2110 (K). It should be noted that, as shown in FIG. 13, the timing with which the synchronization signals DETP_Y, DETP_M, DETP_C and DETP_K, are output is different for each signal, and thus the signals are asynchronous. This asynchronicity arises because the Y, M side and the C, K side do not use the same mirror surface and because the position of the laser beam emitted from each of the laser diode units is different. However, an interval exists in which an assert edge of the synchronization signals DETP indicated in FIG. 3 with the letter X, and that interval can be deduced from the accuracy with which the parts of the optical unit have been assembled.

The laser diode control board (Y) 2111 outputs a synchronization signal DPSYNC_Y synchronized to the write clock of the laser diode (Y) based on the DETP_Y from the synchronization separation circuit (Y) 2107 to the reference selection circuit 2106. Similarly, as a synchronization signal, the laser diode control board (M) 2112, the laser diode control board (C) 2113 and the laser diode control board (K) 2114 output DPSYNC_M, DPSYNC_C and DPSYNC_K, respectively. The reference selection circuit 2106 arbitrarily selects from among the Y, M, C and K synchronization signals DPSYNC and generates a reference signal CNT_LD using the arbitrary timing of the selected DPSYNC.

The timing_Y generator circuit 2102 delays an XSTART signal output from a regist sensor 2101 as a detection signal detecting a passage of a leading edge of the transfer paper 1 until the reference signal CNT_LD, conducts a count of set line numbers DPSYNC_Y for a PFGDLY_Y from the reference signal CNT_LD, asserts a frame synchronization signal XFSYNC_Y that functions as a sub-scanning effective region trigger signal and transmits the frame synchronization signal together with a write synchronization signal XWRSYNC_Y that functions as a scanning trigger signal to the copy application 2100. It should be noted that the XLDSYNC_Y shown in FIG. 13 is a synchronization signal generated at an intermediate stage in the production of the write synchronization signal XWRSYNC_Y, and corresponds to the DPSYNC_Y signal.

For colors other than yellow the process is the same as described above, so that the XFSYNC_M is asserted at the count of the set line numbers DPSYNC_M of the PFGDLY_M from the CNT_LD, the XFSYNC_C is asserted at the count of the set line numbers DPSYNC_C of the PFGDLY_C from the CNT_LD, and the XFSYNC_K is asserted at the count of the set line numbers DPSYNC_K of the PFGDLY_K from the CNT_LD, respectively, and are transmitted together with respective write synchronization signals XWRSYNC_M, XWRSYNC_C and XWRSYNC_K to the copy application 2100.

A description will now be given of another operation of the control circuit shown in FIG. 12, with reference to a time chart shown in FIG. 14.

Figure 14:
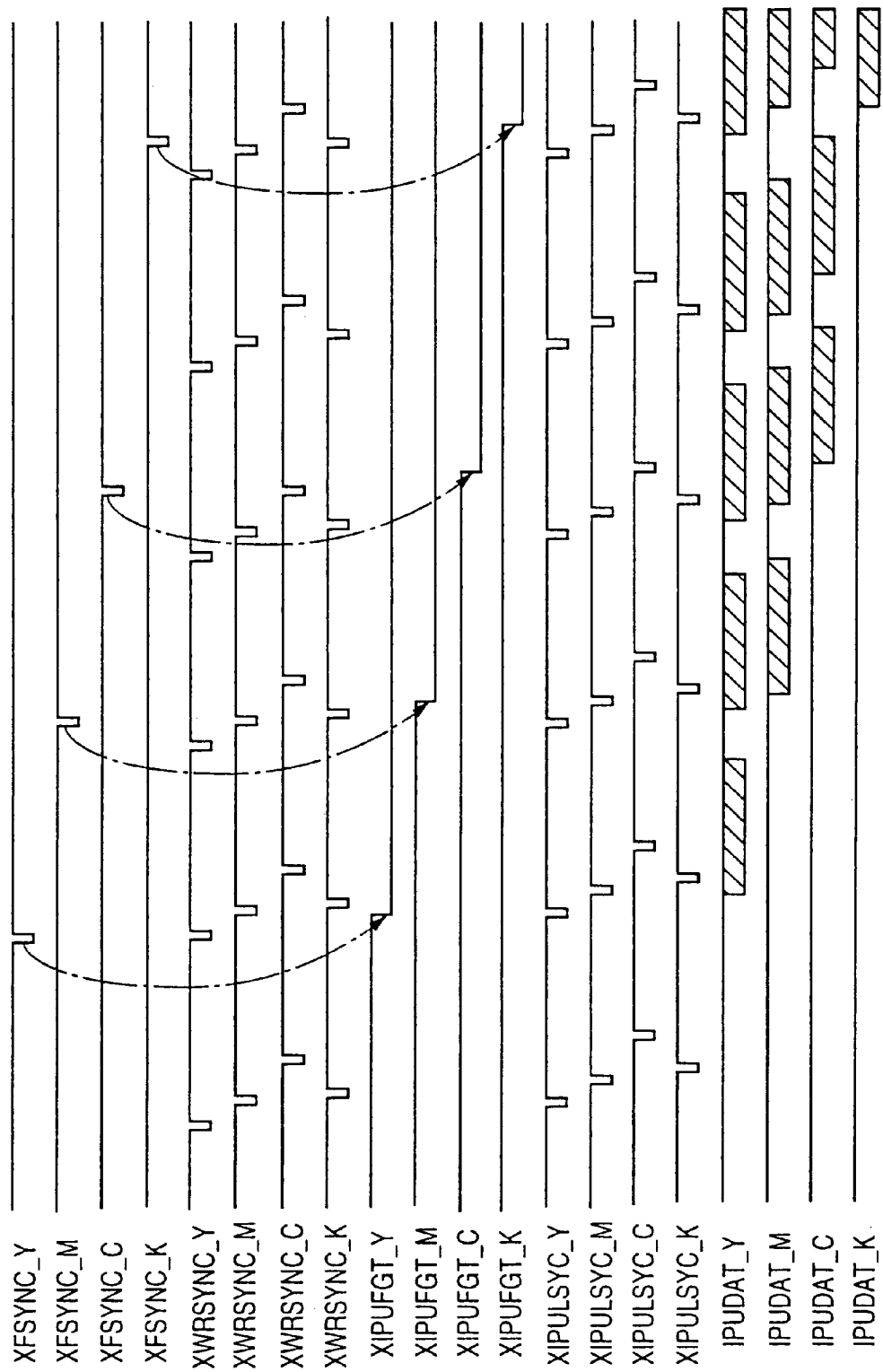
FIG. 14 is a diagram showing transmission timing of signals and image data generated at the copy application in correspondence to a transmission timing of signals transmitted from the timing generator circuits to the copy application and transmitted to laser diode control boards.

FIG. 14 is a time chart showing transmission timing of signals and image data generated at the copy application in correspondence to a transmission timing of signals transmitted from the timing generator circuits to the copy application and transmitted to laser diode control boards. It should be noted that, in FIG. 14, the write synchronization signals XWRSYNC and the frame synchronization signals XFSYNC transmitted from the timing generator circuits 2102, 2103, 2104 and 2105 are the same as those depicted in FIG. 13.

As can be seen in FIG. 14, for each color the copy application 2100 generates frame gate signals XIPUFGT from the frame synchronization signals XFSYNC that function as sub-scanning effective region trigger signals and scanning line synchronization signals XIPULSYC from the write synchronization signals XWRSYNC that function as scanning line trigger signals, and sends back image data IPUDAT to the laser diode control board 2111, 2112, 2113 and 2114 corresponding to each color, the IPUDAT being synchronized to the XIPUFGT and the XIPULSYC. The laser diode control boards 2111, 2112, 2113 and 2114 control the lighting of the laser diodes corresponding to the image data from the copy application 2100 in accordance with the above-described signals sent to the laser diode control boards 2111, 2112, 2113 and 2114 from the copy application 2100.

The present embodiment is described with reference to a connection to the copy application 2100. However, by using the same interface it is possible to easily form an image even in a configuration in which the copy application is replaced with a printer application (that is, a printer controller) or a facsimile application, or an expanded configuration in which the latter two applications are added and one or the other selected for use. As can be appreciated by those skilled in the art, such an expanded configuration can be accommodated by providing a selection signal that selects an application and that sets an output of the non-selected application to Hi-z.

In a case in which an image is formed using image data transmitted from an application selected from among the three types of applications described above, it should be noted that differences in the capabilities of the applications produces differences in image data resolution, so that, for example, as indicated above, although resolutions of 1200, 600 and 300 dpi are standard for printer controllers, a resolution of 600 dpi alone is standard among copy applications, while among fax applications resolutions are measured not in dpi but in lines per mm.

The present invention accommodates the above-described differences in resolution not by varying the rotation speed of the polygon motor (that is, the period of the scan of the laser beam) or the frequency with which the LD is lit as in the conventional art but by a process of thinning out lines using a fixed periodic signal DETP as a reference when different pixel densities are involved. By generating a write synchronization signal XWRSYNC using the scanning line synchronization signal XIPULSYC output from the application, one line of data is transmitted to the application for every write synchronization signal XWRSYNC, thereby accommodating differences in resolution through the use of a simple interface.

Additionally, the present invention also accommodates differences in resolution by setting the image forming apparatus write density to the smallest multiple of the resolution employed by each application. Thus, in a case using the three applications described above, the write density is set to 1200 dpi and the difference between the resolution and the write density is resolved using a line memory and a multiplication method.

In the operating example shown in the time chart of FIG. 14, the rotation speed of the polygon motor (laser beam scan period) and the laser diode lighting frequency are fixed, and the apparatus is set to be operated at a uniform write density (for example, of 1200 dpi). Additionally, in the example shown in the chart, line synchronization signals XIPULSYNC of the image data from the application 2100 are generated in accordance with the write synchronization signals XWRSYNC generated without thinning out by the timing generator circuits 2102, 2103, 2104 and 2105, and image data IPUDAT for each line is added to each of the line synchronization signals XIPULSYNC. Accordingly, what is shown in FIG. 14 is a case in which the image formed by the image forming unit is on in which the write density of the image forming apparatus is the same as the resolution of the application.

Figure 15:
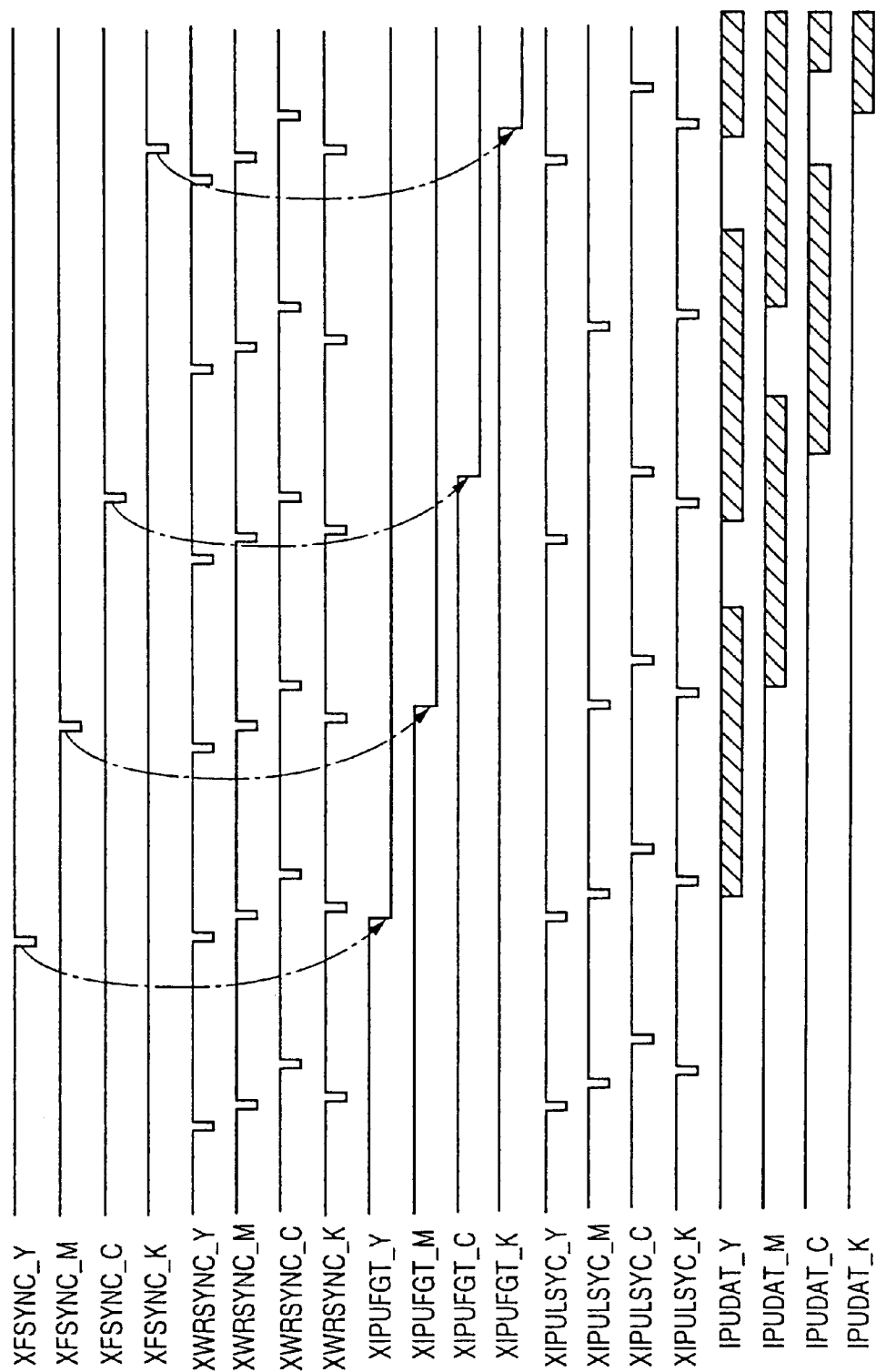
FIG. 15 is the same timing chart as shown in FIG. 14, showing an operation in a case in which resolution is ½ write density.

By contrast, an operation of the present invention in a case in which the resolution of the application and the write density of the image forming apparatus are different, that is, for example, a case in which application resolution is ½ image forming apparatus write density, such as a resolution of 600 dpi and a write density of 1200 dpi, is shown in the time chart shown in FIG. 15.

FIG. 15 is the same timing chart as shown in FIG. 14, showing an operation in a case in which resolution is ½ write density, that is, a time chart showing transmission timing of signals and image data generated at the copy application in correspondence to a transmission timing of signals transmitted from the timing generator circuits to the copy application and transmitted to the laser diode control board 2111, 2112, 2113 and 2114; and The difference between such a situation and a situation as described above in which the resolution and the write density are identical is that, at the timing generator circuits 2102, 2103, 2104 and 2105 that correspond to each color, thinning out of every other line (that is, ½ thinning out) is performed based on the XLDSYNC after the frame synchronization signal XFSYNC is asserted and the result output to the application 2100 as the wrote synchronization signal XWRSYNC. Here, the thinning out rate is determined by the ratio of the application resolution to the image forming apparatus write density.

When the above-described frame synchronization signal XFSYNC and write synchronization signal XWRSYNC are input to the application board 2100, the application board 2100 uses the input frame synchronization signal XFSYNC and write synchronization signal XWRSYNC to commence transmission of the frame gate signal XIPUFGT and the scanning line synchronization signal XIPULSYNC so that the transmission ratio is 1:1, that is, one frame gate signal XIPUFGT is transmitted for one scanning line synchronization signal XIPULSYNC. That is, as shown in the chart in FIG. 15, the application 2100 generates an image data line synchronization signal XIPULSYNC according to the ½ thinned-out write synchronization signal XWRSYNC generated by the timing generator circuits 2102, 2103, 2104 and 2105, and matches image data IPUDAT of each individual line to each line synchronization signal XIPULSYNC. Accordingly, an image is formed by multiplying the image data for each line at the application 2100. In so doing, control of the write units of the laser diode control board of the image forming apparatus is simple even when the application resolution and the image forming apparatus write density are different.

When a predetermined number of lines of image data are transmitted, the frame gate signal XIPUFGT is negated. When the frame gate signal XIPUFGT is negated, the timing generator circuits 2102, 2103, 2104 and 2105 described above stop thinning out the write synchronization signal XWRSYNC and return to a normal timing, awaiting the next image formation. Here, the laser diode control boards 2111, 2112, 2113 and 2114 use a line memory to perform a multiplication process and accomplish a resolution of 1200 dpi and expose the photosensitive drum.

Other resolutions can also be accommodated by using the method described above. Additionally, when a facsimile application is used, a resolution of for example 16 lines/mm converts to a resolution of 406 dpi, necessitating precise coordination with the polygon motor. However, such a situation can be accommodated by setting the timing generator circuits 2102, 2103, 2104 and 2105 to 400 dpi and tripling the multiplication process.

According to the image forming apparatus described above, the application board image memory can be effectively utilized, system-wide costs can be reduced, ease of application board expansion is enhanced and images of high quality with no color blurring can be achieved.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 2000-251279, filed on Aug. 22, 2000, Japanese Priority Application No. 2000-275283, filed on Sep. 11, 2000, and Japanese Priority Application No. 2000-326746, filed on Oct. 26, 2000, the entire contents of each of which are hereby incorporated by reference.

What is claimed is:

1. An image forming apparatus for forming an image on a transfer paper using a laser beam generated from a laser generating means, the color image forming apparatus comprising:
   an adjustment component that adjusts a sub-scanning regist up to the timing of an operation commencement signal from a regist sensor and an electrostatic latent image formation operation commencement, such that a succeeding operation commencement signal becomes active during electrostatic latent image formation;
   a scanning synchronization signal generating component;
   an image effective interval signal generating component; and
   a line data synchronization signal generating component that generates a line data synchronization signal synchronized to image data of each line at least during an interval in which the image effective interval signal is active,
   the image forming apparatus using the scanning synchronization signal, the image effective interval signal and the line data synchronization signal to transfer data.

2. The image forming apparatus as claimed in claim 1, wherein an image delay in a sub-scanning direction is controlled based on the scanning synchronization signal.

3. The image forming apparatus as claimed in claim 1, wherein an image effective interval signal length is controlled based on the line data synchronization signal.

4. The image forming apparatus as claimed in claim 1, wherein the line data synchronization signal includes a pulse of identical timing with respect to the scanning synchronization signal.

5. The image forming apparatus as claimed in claim 4, wherein the line data synchronization signal thins out a pulse according to a sub-scanning multiple.

6. The image forming apparatus as claimed in claim 4, wherein the line data synchronization signal includes a pulse having a timing corresponding to a sub-scanning multiple and a number of beams of a laser diode that forms an electrostatic latent image.

7. The image forming apparatus as claimed in claim 1, wherein the line data synchronization signal includes a pulse of different timing with respect to the scanning synchronization signal.

8. The image forming apparatus as claimed in claim 7, wherein the pulse timing is variable.

9. The image forming apparatus as claimed in claim 7, wherein the line data synchronization signal includes a pulse having a timing that corresponds to a number of beams of a laser diode that forms an electrostatic latent image.

10. An image forming apparatus for forming an image on a transfer paper using a laser beam generated from a laser generating means, the image forming apparatus comprising:
    an image forming component that includes means for periodically line scanning in a scanning direction a photosensitive body movable in a sub-scanning direction with a laser beam carrying image data and exposing a photosensitive surface using the laser beam;
    an application board that produces image data and transfers the image data so produced to the image forming component;
    trigger signal generating means for generating a scanning line trigger signal and a sub-scanning effective region trigger signal for transferring at a predetermined timing the image data from the application board to the image forming component based on a laser beam scan synchronization signal;
    communication means for communicating the scanning line trigger signal and the sub-scanning effective region trigger signal to the application board; and
    transferring means for generating a scanning line synchronization signal based on the communicated scanning line trigger signal and generating a sub-scanning effective region signal based on the sub-scanning effective region trigger signal, and transferring image data to the image forming component in synchrony with the scanning line synchronization signal and the sub-scanning effective region signal.

11. The image forming apparatus as claimed in claim 10, wherein the transfer trigger signal generating means changes a period of a scanning line trigger signal to be produced according to a resolution of an image data produced by an application board.

12. The image forming apparatus as claimed in claim 11, wherein the transfer trigger signal generating means uses the interval in which the period of the scanning line trigger signal to be produced is changed as a period indicating an effective region of a sub-scanning effective region signal from the application board.

13. An image forming apparatus for forming an image on a transfer paper using a laser beam generated from a laser generating component, the color image forming apparatus comprising:

an adjustment component that adjusts a sub-scanning regist up to the timing of an operation commencement signal from a regist sensor and an electrostatic latent image formation operation commencement, such that a succeeding operation commencement signal becomes active during electrostatic latent image formation;

a scanning synchronization signal generating component that generates a scanning synchronization signal;

an image effective interval signal generating component that generates an image effective interval signal; and a line data synchronization signal generating component that generates a line data synchronization signal synchronized to image data of each line at least during an interval in which the image effective interval signal is active;

the image forming apparatus using the scanning synchronization signal, the image effective interval signal and the line data synchronization signal to transfer data.

14. The image forming apparatus as claimed in claim 13, wherein an image delay in a sub-scanning direction is controlled based on the scanning synchronization signal.

15. The image forming apparatus as claimed in claim 13, wherein an image effective interval signal length is controlled based on the line data synchronization signal.

16. The image forming apparatus as claimed in claim 13, wherein the line data synchronization signal includes a pulse of identical timing with respect to the scanning synchronization signal.

17. The image forming apparatus as claimed in claim 16, wherein the line data synchronization signal thins out a pulse according to a sub-scanning multiple.

18. The image forming apparatus as claimed in claim 16, wherein the line data synchronization signal includes a pulse having a timing corresponding to a sub-scanning multiple and a number of beams of a laser diode that forms an electrostatic latent image.

19. The image forming apparatus as claimed in claim 13, wherein the line data synchronization signal includes a pulse of different timing with respect to the scanning synchronization signal.

20. The image forming apparatus as claimed in claim 19, wherein the pulse timing is variable.

21. The image forming apparatus as claimed in claim 19, wherein the line data synchronization signal includes a pulse having a timing that corresponds to a number of beams of a laser diode that forms an electrostatic latent image.

22. An image forming apparatus for forming an image on a transfer paper using a laser beam generated from a laser generating component, the image forming apparatus comprising:

an image-forming component that includes a component that periodically scans in a scanning direction a photosensitive body movable in a sub-scanning direction with a laser beam carrying image data and exposing a photosensitive surface using the laser beam;

an application board that produces image data and transfers the image data so produced to the image forming component;

a trigger signal generating component that generates a scanning line trigger signal and a sub-scanning effective region trigger signal for transferring at a predetermined timing the image data from the application board to the image forming component based on a laser beam scan synchronization signal;

a communication component for communicating the scanning line trigger signal and the sub-scanning effective region trigger signal to the application board; and a transfer component that generates a scanning line synchronization signal based on the communicated scanning line trigger signal and generates a sub-scanning effective region signal based on the sub-scanning effective region trigger signal, and transfers image data to the image forming component in synchrony with the scanning line synchronization signal and the sub-scanning effective region signal.

23. The image forming apparatus as claimed in claim 22, wherein the transfer trigger signal generating component changes a period of a scanning line trigger signal to be produced according to a resolution of an image data produced by an application board.

24. The image forming apparatus as claimed in claim 23, wherein the transfer trigger signal generating component uses the interval in which the period of the scanning line trigger signal to be produced is changed as a period indicating an effective region of a sub-scanning effective region signal from the application board.

* * * * *